United States Patent [19]
Winkler

[11] 3,722,388
[45] Mar. 27, 1973

[54] SINGLE-LENS REFLEX CAMERA
[75] Inventor: Alfred Winkler, Munich, Germany
[73] Assignee: Agfa-Gevaert, Aktiengesellschaft, Leverkusen, Germany
[22] Filed: Sept. 23, 1971
[21] Appl. No.: 182,984

[30] Foreign Application Priority Data

Sept. 25, 1970 Germany.................P 20 47 363.4

[52] U.S. Cl......................95/31 AC, 95/11 R, 95/42
[51] Int. Cl..............................................G03b 19/12
[58] Field of Search.........95/31 AC, 11 R, 42, 58, 53

[56] References Cited

UNITED STATES PATENTS

| 3,502,013 | 3/1970 | Shimoda | 95/31 R |
| 2,104,094 | 1/1938 | Nerwin | 95/31 AC |
| 2,930,303 | 3/1960 | Yoshiharu Sago et al. | 95/31 AC |
| 3,183,520 | 5/1965 | Schaefer | 200/83 R X |
| 2,333,778 | 11/1943 | Green et al. | 95/53 R |
| 3,447,440 | 6/1969 | Ettischer | 95/42 |

FOREIGN PATENTS OR APPLICATIONS 1,191,222 4/1965 Germany...........................95/42

Primary Examiner—Robert P. Greiner
Attorney—Michael S. Striker

[57] ABSTRACT

A single-lens reflex camera wherein the shutter can be opened and the mirror pivoted from the light reflecting position by an actuating mechanism which is operated in response to deformation of a diaphragm forming part of the release device. The diaphragm is mounted in the cylindrical hub of a rapid film transport lever and can operate the actuating mechanism by way of a pin which is coaxial with the lever, a blocking lever and a spring biased rod. The rod can be retracted to its normal position to allow for resetting of the actuating mechanism by a spring-biased member which is cocked by the film transport lever and uncocked by a cam upon completed operation of the actuating mechanism to thereby automatically return the rod to its normal position in which the rod is held by the blocking lever.

17 Claims, 1 Drawing Figure

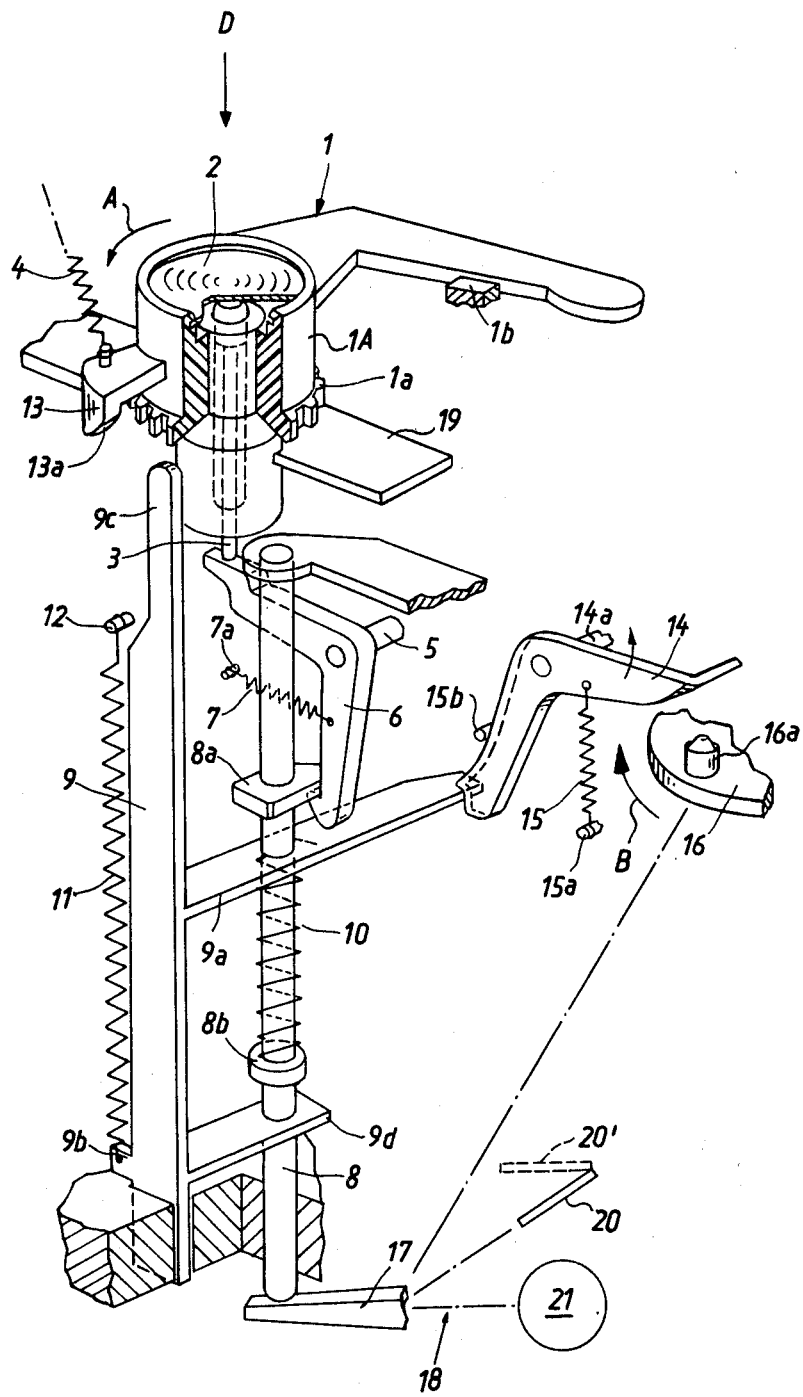

SINGLE-LENS REFLEX CAMERA

CROSS-REFERENCE TO RELATED APPLICATION

The photographic apparatus of the present invention constitutes a further development of the apparatus which is disclosed in the commonly owned copending application Serial No. 749,170 filed July 31, 1968.

BACKGROUND OF THE INVENTION

The present invention relates to photographic apparatus in general, and more particularly to improvements in single-lens reflex cameras. Still more particularly, the invention relates to improvement in release devices for use in single-lens reflex cameras.

Still cameras, including single-lens reflex cameras, are normally actuated in response to depression of a release button which must be displaced through a considerable distance in order to trigger a movement of the mirror from its light-reflecting position, to actuate the shutter so that the latter admits scene light against an unexposed film frame, and/or to actuate one or more additional camera components. A drawback of such release devices is that the operator cannot make satisfactory exposures without restoring to a tripod or another suitable support for the camera housing when the desirable exposure time is longer than a relatively short exposure time, normally one-sixtieth of a second. The camera shake which affects the quality of exposures will be felt in most instances if the exposures are made with an exposure time which is longer than one-sixtieth of a second.

SUMMARY OF THE INVENTION

An object of the present invention is to provide a still camera, particularly a single-lens reflex camera, with a novel and improved release device which enables an average photographer to make satisfactory exposures, free of the effects of camera shake, even if the manually or automatically selected exposure time is relatively long, e.g., one-thirtieth or one-fifteenth second.

Another object of the invention is to provide a single-lens reflex camera with a release device which occupies little room, which occupies room that is normally available in such types of cameras, and which can be used to effect the actuation of one or more camera components, particularly the shutter and the mirror.

A further object of the invention is to provide a single-lens reflex camera wherein the various components are automatically prepared for the next exposure in response to lengthwise transport of the film so as to place an unexposed film frame into requisite position with reference to the picture taking lens.

An additional object of the invention is to replace the customary release button of a single-lens reflex camera with a superior manually actuatable element and to provide a novel and improved operative connection between the release device and the film transporting mechanism.

The invention resides in the provision of a still camera, preferably a single-lens reflex camera, which comprises a housing or body, a plurality of camera components which are mounted in or on the housing and include a shutter which is actuatable to admit scene light against an unexposed film frame, a mirror which is actuatable to move from a light-reflecting first or normal position to a second position in which it allows scene light to reach an unexposed film frame on opening of the shutter and/or one or more additional camera components which can be actuated to perform one or more functions during the making of exposures, actuating means mounted in the housing and being operable to actuate at least one camera component (e.g., the shutter and the mirror), and release means for operating the actuating means. In accordance with a feature of the invention, such release means comprises a diaphragm which is accessible from without the housing and is deformable to thereby effect the operation of the actuating means, preferably in response to minute deformation of the diaphragm.

In accordance with another feature of the invention, the film transporting mechanism of the camera comprises a portion which is rotatable in the housing about a fixed axis and the diaphragm is mounted in such rotary portion of the film transporting mechanism. The release means preferably further comprises a member which is coaxial with the rotary portion of the film transporting mechanism and is displaced axially in response to deformation of the diaphragm.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is an enlarged fragmentary partly diagrammatic perspective view of a single-lens reflex camera which embodies the invention.

DESCRIPTION OF THE PREFERRED EMBODIMENTS

The drawing illustrates a portion of a single-lens reflex camera having a household which includes a top wall 19. The wall 19 supports a rapid film transport lever 1 which forms part of a conventional film transporting mechanism and is pivotable to effect forward movement of properly inserted photographic film by the length of a frame through the intermediary of a gear 1a. A helical return spring 4 normally maintains the lever 1 in the illustrated starting position in which the lever abuts against a fixed stop 1b of the housing. The lever 1 has a cylindrical hub 1A which is coaxial with the gear 1a and accommodates a portion of a novel release device including a diaphragm 2 which can be deformed to thereby effect the opening of a shutter 21 and the pivoting of a conventional mirror 20 from the illustrated solid-line light-reflecting first position in which it directs scene light into the view finder (not shown) to a broken-line second position 20' in which it prevents stray light from entering the camera by way of the view finder. The release device including the diaphragm 2 can also serve to actuate other camera components, such as an automatic exposure control which adjusts the shutter and/or the diaphragm (not shown) prior to admission of scene light against an unexposed film frame.

The release device further comprises a pin 3 which is coaxial with the hub 1A of the rapid transport lever 1 and is mounted in the hub to move axially downwardly in response to application of deforming pressure against the exposed upper side of the diaphragm 2 (arrow D). The lower end portion of the pin 3 abuts against one arm of a two-armed blocking lever 6 of the release device which is pivotable on a fixed pivot pin 5 and is biased in a clockwise direction, as viewed in the drawing, by a helical spring 7 one end of which is attached to a stationary post 7a. The other arm of the blocking lever 6 is provided with a tooth which normally engages the underside of a projection or flange 8a provided on a vertically reciprocable motion transmitting rod 8 of the release device. A cocking device which serves to stress a helical spring 10 for the motion transmitting rod 8 comprises a vertically reciprocable cocking member or slide 11 having a horizontal arm 9a provided with a hole for the rod 8 and serving as an abutment for the upper end convolution of the spring 10. This spring reacts against the arm 9a and bears against a ring-shaped collar 8b of the rod 8. When properly stressed, the spring 10 urges the rod 8 axially downwardly but such downward movement of the rod 8 is normally prevented by the blocking lever 6 whose tooth engages the flange 8a from below and thus maintains the rod 8 in the illustrated upper end position. A strong helical spring 11 is attached to a post 12 of the camera housing and to a post 9b which is close to the lower end of the member 9 so as to urge the member 9 upwardly with a force which exceeds the force of the spring 10. The upper end portion or tip 9c of the cocking member 9 can move into the range of the suitably inclined face 13a of a cam 13 which is provided directly on or receives motion from the rapid transport lever 1 so as to depress the member 9 and to thereby stress the spring 11 when the lever 1 is rotated in a counterclockwise direction (arrow A) to transport the film by the length of a frame.

The arm 9a of the cocking member 9 extends into the path of movement of a pallet on one arm of a two-armed arresting lever 14 which is pivotable on a fixed pin 14a and is biased in a clockwise direction, as viewed in the drawing, by a helical spring 15 one end of which is attached to a fixed post 15a. The other arm of the arresting lever 14 can be engaged and pivoted by a protuberance 16a on a disk-shaped displacing cam 16.

The lower end portion of the motion transmitting rod 8 is adjacent to a lever 17 which forms part of an actuating mechanism 18. The latter can cause the shutter 21 to open and the mirror 20 to pivot to the position 20' in response to downward movement of the rod 8. The actuating mechanism 18 is further operatively connected with the displacing cam 16.

The cocking member 9 may serve as a means for resetting the actuating mechanism 18 (so that it is ready for the next actuation of the shutter 21 and mirror 20) in response to downward movement of the member 9 under the action of the cam 13. This insures that the actuating mechanism 18 is in operative condition not later than when a fresh film frame is moved into requisite position with reference to the picture taking lens, not shown.

The operation:

The drawing illustrates the parts in positions they assume when the single-lens reflex camera is ready for an exposure. The spring 11 is stressed because the arm 9a of the cocking member 9 is held against upward movement by the pallet of the arresting lever 14. The spring 10 reacts against the arm 9a and bears against the collar 8b to urge the motion transmitting rod 8 downwardly, but such movement of the rod 8 is prevented by the blocking lever 6 which engages the underside of the flange 8a. The shutter 21 is closed and the mirror 20 dwells in the solid-line position in which it directs scene light into the view finder and preferably allows some scene light to reach a photosensitive element of the automatic exposure control which can adjust the shutter 21 and/or the diaphragm as a function of scene brightness.

In order to make an exposure, the operator applies to the exposed upper side of the diaphragm 2 a deforming force which acts on the diaphragm in the direction indicated by the arrow D and causes the pin 3 to move downwardly and to pivot the blocking lever 6 in a counterclockwise direction against the opposition of the spring 7. The lower arm of the lever 6 then moves away from and releases the flange 8a so that the spring 10 is free to expand and moves the rod 8 vertically downwardly to pivot the lever 17 of the actuating mechanism 18. The latter causes the shutter 21 to open and to admit scene light against an unexposed film frame subsequent to movement of the mirror 20 to the position 20' in which the mirror allows scene light to reach the unexposed film frame. Such movement of the mirror 20 to the position 20' is also caused by the actuating mechanism 18. As mentioned before, the mechanism 18 can actuate one or more additional components of the camera, such as a frame counter. The spring 10 is preferably allowed to assume a fully unstressed condition when the blocking lever 6 is disengaged from the flange 8a.

When the shutter 21 closes after a preset interval of time or after an interval which is determined by the exposure control as a function of scene brightness, the actuating mechanism 18 (or a movable part of the shutter 21) causes or allows the displacing cam 16 to turn in the direction indicated by the arrow B whereby the protuberance 16a pivots the arresting lever 14 in a counterclockwise direction to stress the spring 15 and to allow the cocking member 9 to move upwardly under the action of the spring 11. As the member 9 moves upwardly under the action of the spring 11 (which is stronger than the spring 10), an entraining arm 9d of the member 9 engages and entrains the collar 8b to move the motion transmitting rod 8 upwardly and to thus stress the spring 10. The flange 8a slides along and above the tooth of the blocking lever 6 so that the latter is free to move to the position shown in the drawing and to thus prevent the rod 8 from moving downwardly excepting upon renewed deformation of the diaphragm 2. It will be noted that the spring 10 is being stressed while the spring 11 dissipates energy.

When the arresting lever 14 is disengaged from the arm 9a, the spring 11 is free to move the cocking member 9 to an upper end position in which the tip 9c extends into the path of movement of the face 13a on the cam 13. Thus, when the rapid transport lever 1 is pivoted by the operator to turn in the direction indicated by the arrow A and to thereby advance the film by the length of a frame, the cam 13 depresses the member 9 by way of the tip 9c and thereby stresses the spring 11. The arm 9a is automatically reengaged by the adjacent arm of the arresting lever 14 so that the spring 11 remains in stressed condition and is ready to stress the spring 10 upon completion of the next exposure. As the member 9 moves downwardly under the action of the cam 13, the arm 9a moves the upper end convolution of the spring 10 toward the collar 8b which cannot share such movement because the flange 8a is held by the blocking lever 6 so that the stressing of spring 11 takes place simultaneously with stressing of the spring 10. It is to be noted that the displacing cam 16 is returned to the illustrated normal position as soon as or shortly after its protuberance 16a causes the arresting lever 14 to release the arm 9a and to thus allow contraction of the spring 11. The cam 16 can be returned to such starting position by a spring (not shown) or in any other suitable way. A fixed stop 15b is provided to arrest the lever 14 in a position in which the lower arm of this lever is located in the path of downward movement of the arm 9a when the latter descends under the action of the cam 13. The lever 1 can be a single- or several-stroke rapid-wind film advance lever.

An important advantage of the novel release device for the shutter 21 and mirror 20 and/or other camera components is that such component or components can be actuated without any or with negligible camera shake so that the operator can make satisfactory exposures with relatively long exposure times without necessitating the use of a tripod or other stationary support means for the camera housing. Furthermore, the improved release device occupies little room and is within reach of the right hand of a right-handed operator whereby such hand can manipulate the lever 1 and can deform the diaphragm 2. Also, the operative connection between the shutter 21 and mirror 20 on the one hand and the diaphragm 2 on the other hand is very simple, reliable and occupies little room. The lever 6 can be readily constructed and mounted in such a way that a minute deformation of the diaphragm 2 (preferably in the range of a small fraction of a millimeter) will suffice to disengage the lever 6 from the flange 8a to thus allow for the making of an exposure. The operator need not be concerned with stressing of the spring 10 of the release device because such stressing takes place in automatic response to actuation of the film transporting mechanism (lever 1).

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a single-lens reflex camera, a combination comprising a housing; a plurality of camera components mounted in said housing and including a shutter actuatable to admit scene light against a film frame and a mirror actuatable to move between a light-reflecting first position and a second position; actuating means mounted in said housing and operable to actuate at least one of said camera components; and release means for operating said actuating means, said release means comprising a diaphragm which is accessible from without said housing and is deformable to thereby effect the operation of said actuating means, a motion transmitting member which is movable from a first to a second position to thereby operate said actuating means, means for biasing said motion transmitting member to said second position, blocking means for normally holding said motion transmitting member in said first position, and means for disengaging said blocking means from said motion transmitting member in response to deformation of said diaphragm.

2. A combination as defined in claim 1, further comprising film transporting means including a portion rotatable about a predetermined axis, said diaphragm being mounted in said portion of said film transporting means.

3. A combination as defined in claim 2, wherein said release means further comprises a reciprocable member which is coaxial with said portion of said film transporting means and is arranged to move axially of such portion in response to deformation of said diaphragm.

4. A combination as defined in claim 1, wherein said motion transmitting member is reciprocable between said first and second positions and said blocking means comprise a lever which is pivotable into and from engagement with said motion transmitting member, said means for disengaging said lever from said motion transmitting member comprising a reciprocable pin interposed between said lever and said diaphragm.

5. A combination as defined in claim 1, wherein said means for biasing said motion transmitting member comprises resilient means which stores energy in the first position of said motion transmitting member and is free to dissipate at least the major part of stored energy in response to completed movement of said motion transmitting member to said second position.

6. A combination as defined in claim 1, further comprising cocking means for moving said motion transmitting member from said second to said first position against the opposition of said biasing means.

7. A combination as defined in claim 6, further comprising film transporting means actuatable to transport the film lengthwise and to thereby return said motion transmitting member from said second to said first position by way of said cocking means.

8. A combination as defined in claim 6, wherein said cocking means includes a cocking member which is movable between a cocked and an uncocked position and further comprising arresting means for normally holding said cocking member in said cocked position and disengaging means arranged to disengage said arresting means from said cocking member upon completed operation of said actuating means whereby said cocking member is free to move said motion transmitting member from said second to said first position in response to movement from the cocked to the uncocked position thereof.

9. A combination as defined in claim 8, wherein said disengaging means is actuatable by said actuating means, 10. A combination as defined in claim 6, wherein said motion transmitting member is reciprocable between said first and second positions and said cocking member is reciprocable between cocked and uncocked positions in substantial parallelism with said motion transmitting member.

11. A combination as defined in claim 6, wherein said cocking means comprises a cocking member which is movable between cocked and uncocked positions and said means for biasing said motion transmitting member comprises resilient means which reacts against said cocking member.

12. A combination as defined in claim 11, wherein said cocking means further comprises second resilient means for urging said cocking member to said uncocked position and for thereby stressing said first mentioned resilient means by way of said motion transmitting member so that the dissipation of energy by said second resilient means brings about a stressing of said first mentioned resilient means.

13. A combination as defined in claim 6, wherein said cocking means comprises a cocking member movable from a cocked position to an uncocked position to thereby move said motion transmitting member to said first position, resilient means for biasing said cocking member to said uncocked position, and further comprising film transporting means actuatable to transport the film lengthwise and to thereby move said cocking member to said cocked position against the opposition of said resilient means.

14. A combination as defined in claim 13, wherein said film transporting means comprises a rotary cam which is arranged to move said cocking member to said cocked position in response to lengthwise transport of the film.

15. A combination as defined in claim 6, wherein said cocking means comprises a cocking member movable from a cocked position to an uncocked position to thereby move said motion transmitting member from said second to said first position, means for biasing said cocking member to said uncocked position, and arresting means for releasably holding said cocking member in said cocked position.

16. A combination as defined in claim 15, further comprising a disengaging cam movable in response to completed operation of said actuating means to thereby disengage said arresting means from said cocking member.

17. A combination as defined in claim 15, wherein said cocking member comprises a first projection and said motion transmitting member comprises a second projection which is engaged and entrained by said first projection in response to movement of said cocking member to said uncocked position to thereby move motion transmitting member from said second to said first position.

* * * * *